US012034308B2

(12) United States Patent
Zhou et al.

(10) Patent No.: US 12,034,308 B2
(45) Date of Patent: Jul. 9, 2024

(54) POWER GENERATION SYSTEM

(71) Applicant: Huawei Digital Power Technologies Co., Ltd., Shenzhen (CN)

(72) Inventors: Peng Zhou, Shanghai (CN); Haiyang Pan, Shanghai (CN); Yazhu Zhao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/903,756

(22) Filed: Sep. 6, 2022

(65) Prior Publication Data

US 2023/0163597 A1  May 25, 2023

(30) Foreign Application Priority Data

Sep. 8, 2021 (CN) .......................... 202111047074.7

(51) Int. Cl.
| | |
|---|---|
| *H02J 3/38* | (2006.01) |
| *H02H 9/04* | (2006.01) |
| *H02J 1/10* | (2006.01) |
| *H02J 3/00* | (2006.01) |
| *H02J 3/28* | (2006.01) |
| *H02M 7/42* | (2006.01) |

(52) U.S. Cl.
CPC .............. *H02J 3/381* (2013.01); *H02J 1/102* (2013.01); *H02J 3/001* (2020.01); *H02J 3/28* (2013.01); *H02M 7/42* (2013.01); *H02H 9/04* (2013.01); *H02J 2300/24* (2020.01)

(58) Field of Classification Search
CPC .... H02J 3/381; H02J 3/001; H02J 3/28; H02J 1/102; H02J 2300/24; H02M 7/42; H02H 9/04

USPC ......................................................... 307/142
See application file for complete search history.

(56) References Cited

U.S. PATENT DOCUMENTS

| | | | |
|---|---|---|---|
| 9,240,682 B2 | 1/2016 | Sivakumar et al. | |
| 2015/0214700 A1* | 7/2015 | Bergeron ............... | H04Q 1/116 361/119 |
| 2019/0341776 A1* | 11/2019 | Au ........................ | H02J 7/0013 |

(Continued)

FOREIGN PATENT DOCUMENTS

| | | |
|---|---|---|
| AU | 2020425507 A1 | 8/2021 |
| CN | 204088986 U | 1/2015 |
| CN | 108565755 A | 9/2018 |

*Primary Examiner* — Hal Kaplan
(74) *Attorney, Agent, or Firm* — Slater Matsil, LLP

(57) ABSTRACT

This application provides a power generation system. The power generation system may include an integration system and a power transformation system. The integration system may include a plurality of inverters and a plurality of first switches. The plurality of inverters are connected in series to the plurality of first switches in a one-to-one correspondence. Each inverter converts a direct current from a direct current power supply into an alternating current, and outputs the alternating current to a corresponding first switch. Alternating currents of the plurality of first switches from corresponding inverters are combined and output to the power generation system, and the plurality of inverters and the power transformation system are isolated from each other. The power transformation system adjusts a voltage value of the combined alternating current and outputs the voltage value to a power grid.

19 Claims, 6 Drawing Sheets

(56) References Cited

U.S. PATENT DOCUMENTS

2021/0006063 A1\* 1/2021 Mackey ............... H02H 1/0007
2021/0344192 A1\* 11/2021 Zhang ..................... H02H 9/02

\* cited by examiner

POWER GENERATION SYSTEM

CROSS-REFERENCE TO RELATED APPLICATIONS

This application claims priority to Chinese Patent Application No. 202111047074.7, filed on Sep. 8, 2021, which is hereby incorporated by reference in its entirety.

TECHNICAL FIELD

This application relates to the field of new energy technologies, and more specifically, to a power generation system in the field of new energy technologies.

BACKGROUND

With the rapid development of science and technology, new energy represented by solar energy has been widely used. A solar photovoltaic (that is, a photovoltaic module) is a power generation apparatus that can convert solar energy into a direct current (DC). The photovoltaic module may be made into different shapes, and a plurality of photovoltaic modules may be connected to a same combiner box (for example, a combiner box) or a same switch box, to form a photovoltaic module means.

Generally, a direct current power supply such as a plurality of photovoltaic module means may be connected to a power grid by using a power generation system, to connect a plurality of direct current power supplies to the power grid. Therefore, how to connect a plurality of high-power (for example, greater than 8 MW) direct current power supplies to the power grid is an urgent problem to be resolved.

SUMMARY

This application provides a power generation system, to connect a high-power direct current power supply to a power grid, where the high-power direct current power supply is formed by a plurality of direct current power supplies.

The power generation system provided in this application may include an integration system and a power transformation system. The integration system includes a direct current input terminal and a first alternating current output terminal. The power transformation system includes an alternating current input terminal and a second alternating current output terminal.

The direct current input terminal is connected to the plurality of direct current power supplies, the first alternating current output terminal is connected to the alternating current input terminal, and the second alternating current output terminal is connected to the power grid.

Further, the integration system may include a plurality of inverters and a plurality of first switches. The plurality of inverters are connected in series to the plurality of first switches in a one-to-one correspondence.

Optionally, an input terminal of each inverter of the plurality of inverters is connected to a corresponding direct current power supply in the plurality of direct current power supplies, and an output terminal of each inverter is connected to one terminal of a corresponding first switch.

Based on the foregoing coupling relationship, it may be determined that:

Each inverter is configured to convert a direct current from the corresponding direct current power supply into an alternating current, and output the alternating current to the corresponding first switch.

The plurality of first switches are configured to combine alternating currents from corresponding inverters, output the combined alternating current to the power transformation system, and isolate the plurality of inverters from the power transformation system.

The power transformation system is configured to adjust a voltage value of the alternating currents combined by the plurality of first switches and output the voltage value to the power grid.

It can be learned from a correspondence relationship and a connection relationship between the inverter and the first switch that, when any one of the plurality of first switches is turned on, an alternating current from a corresponding inverter may be output to the power transformation system. When any first switch is turned off, a corresponding photovoltaic inverter may be isolated from the power transformation system, to protect the inverter and the power transformation system.

According to the power generation system provided in this application, the plurality of direct current power supplies may be connected to the power grid by using the plurality of inverters and the plurality of first switches, and a quantity of the direct current power supplies is not limited. Therefore, a high-power (for example, 8 MW) direct current power supply that is formed by the plurality of direct current power supplies can be connected to the power grid.

In an example, the inverter may be a string inverter. The string inverter has a function of maximum power point tracking (MPPT) of a plurality of inputs, may be flexibly configured and conveniently replaced and has a high output power. This facilitates maintenance of the entire integration system (also referred to as the power generation system). Certainly, the inverter may alternatively be another type of inverter. This is not limited in this application.

In still another example, there are two cases in which the plurality of inverters may be isolated from the power transformation system by using the plurality of first switches:

Case 1: If an inverter corresponding to any one of the plurality of first switches is faulty and/or the power transformation system is faulty, the first switch may be turned off based on a first control instruction from a collection module in the power generation system. The first control instruction instructs to turn off the first switch.

Case 2: If an inverter corresponding to any one of the plurality of first switches is faulty and/or the power transformation system is faulty, the first switch may be automatically turned off.

It should be noted that, in the two cases, the inverter corresponding to the first switch may be isolated from the power transformation system, and this protects the inverter and the power transformation system, and avoids fault escalation.

In another example, the first switch may be an alternating current switch.

Further, the alternating current switch may be an alternating current circuit breaker or an alternating current fuse. Alternatively, another device configured to isolate and protect the inverter and the power transformation system may be used. This is not limited in this application.

In a possible implementation, the integration system may further include a plurality of second switches. The plurality of second switches may be connected in series to the plurality of inverters in a one-to-one correspondence.

One terminal of each second switch of the plurality of second switches is connected to a corresponding direct current power supply, and the other terminal of each second switch is connected to an input terminal of a corresponding inverter.

The second switch is configured to isolate the corresponding direct current power supply from the corresponding inverter.

Optionally, similar to the first switch, there are two cases in which the second switch isolates the corresponding direct current power supply from the corresponding inverter:

Case 1: If a direct current power supply is faulty and/or an inverter corresponding to any one of the plurality of second switches is faulty, the second switch may be turned off based on a second control instruction from the collection module in the power generation system. The second control instruction instructs to turn off the second switch.

Case 2: If a direct current power supply is faulty and/or an inverter corresponding to any one of the plurality of second switches is faulty, the second switch is automatically turned off.

It should be noted that, in the two cases, the direct current power supply corresponding to the second switch may be isolated from the corresponding inverter, and this protects the direct current power supply and the inverter, and avoids fault escalation.

Optionally, the second switch may be a direct current switch. Further, the direct current switch may be a direct current circuit breaker or a direct current fuse, or may be another device configured to isolate and protect the direct current power supply and the inverter. This is not limited in this application.

It can be learned from a correspondence relationship and a connection relationship between the plurality of second switches and the plurality of direct current power supplies and between the plurality of second switches and the plurality of inverters that, when any one of the plurality of second switches is turned on, a direct current generated by a corresponding direct current power supply can be transmitted to a corresponding inverter. When any one of the plurality of second switches is turned off, the corresponding direct current power supply may be isolated from the corresponding inverter, to protect the direct current power supply and the inverter.

In a possible implementation, each second switch may be connected to the corresponding direct current power supply by using a first bonding conductor.

For example, the first bonding conductor may be a direct current cable. In other words, the second switch may be connected to the direct current power supply by using the direct current cable.

It can be learned that in this application, the integration system may be connected to the direct current power supply by using only the direct current cable (that is, the first bonding conductor). In other words, each inverter in the integration system may be connected to the corresponding direct current power supply by using the direct current cable. This avoids complex onsite construction and installation between the inverter and the corresponding direct current power supply, avoids complex cabling and layout between the inverter and the corresponding direct current power supply, and facilitates maintenance of the power generation system.

Further, the integration system may further include a plurality of surge protection devices. Each surge protection device of the plurality of surge protection devices is connected to a corresponding first bonding conductor.

For example, the surge protection device may be configured to prevent the inverter from being damaged by a surge overvoltage. The surge protection device may be a lightning arrester or a surge protector. Certainly, the surge protection device may alternatively be another type of device configured to protect the inverter. This is not limited in this application.

In a possible implementation, the power transformation system may include a first isolation module, a transformer, and a second isolation module.

An input terminal of the first isolation module (that is, the alternating current input terminal of the power transformation system) is connected to each first switch of the plurality of first switches, an output terminal of the first isolation module is connected to an input terminal of the transformer, an output terminal of the transformer is connected to an input terminal of the second isolation module, and an output terminal of the second isolation module (that is, the second alternating current output terminal of the power transformation system) is connected to the power grid.

Optionally, the output terminal of the second isolation module may be connected to the power grid by using an alternating current cable.

It can be learned that a cable connection between the power transformation system (that is, the second isolation module) in this application and the power grid is simple, and the power transformation system may be connected to the power grid by using only the alternating current cable. This facilitates operation and maintenance of the power generation system.

Based on the connection relationship, it may be determined that:

The first isolation module is configured to transmit an alternating current transmitted by each first switch (that is, an alternating current of the inverter) to the transformer, and isolate each first switch (that is, the integration system) from the transformer.

Further, the transformer is configured to adjust an alternating current from the first isolation module (for example, a boost), and output the adjusted alternating current to the second isolation module.

Still further, the second isolation module is configured to transmit the adjusted alternating current to the power grid, and isolate the transformer from the power grid.

Optionally, the transformer in this application may be a pillow transformer or a corrugated transformer. However, the pillow transformer or the corrugated transformer may be a three-winding transformer. In other words, the transformer may include two primary-side windings and one secondary-side winding. Certainly, a transformer of another structure may alternatively be used. This is not limited in this application.

Because the transformer in this application uses the three-winding transformer, the first isolation module may be provided with two alternating current main switches. The two alternating current main switches are between all inverters and all transformers in the integration system. Therefore, the two alternating current main switches may be configured to isolate all inverters from all transformers, to protect all the inverters and all the transformers.

It can be learned that, the integration system (that is, the inverter in the integration system) may be isolated from the transformer by using only the two alternating current main switches in the first isolation module. Therefore, an isolation manner is simple and reliability is high.

It may be further understood that the second isolation module is disposed between the transformer and the power grid. Therefore, the second isolation module may be configured to isolate the power grid from the transformer, to protect the transformer and the power grid.

In an example, because the first isolation module includes the two alternating current main switches, the integration system may further include two second bonding conductors. The other terminal of the first switch is connected to the two second bonding conductors.

Therefore, the input terminal of the first isolation module (that is, the alternating current input terminal of the power transformation system, that is, respective input terminals of the two alternating current main switches) may be connected to the second bonding conductor by using two third bonding conductors.

In other words, the input terminal of one of the alternating current main switches may be connected to one second bonding conductor through one of the third bonding conductors. The input terminal of the other alternating current main switch may be connected to the other second bonding conductor through the other third bonding conductor.

Optionally, the two second bonding conductors and the two third bonding conductors may be a soft connection busbar. A soft connection between the integration system and the power transformation system may be implemented by using the soft connection busbar, to facilitate assembly between the integration system and the power transformation system.

Based on the connection relationship, it may be determined that the second bonding conductor may be configured to: combine alternating currents of the first switches, and transmit the combined alternating current to the power transformation system (that is, the alternating current main switch in the first isolation module) by using the third bonding conductor.

It may be understood that the integration system may simultaneously combine direct currents from different direct current power supplies and alternating currents from different inverters.

In a possible implementation, the direct current power supply may be a photovoltaic module means.

The photovoltaic module means may include a plurality of photovoltaic modules and one combiner box. The plurality of photovoltaic modules may be connected to the combiner box by using the direct current cable.

It should be noted that a quantity of photovoltaic modules in the photovoltaic module means may be equal or unequal.

Further, an output terminal of each photovoltaic module is connected to an input terminal of the combiner box, and an output terminal of the combiner box may be connected to an input terminal of a corresponding inverter (that is a direct current side of the string inverter) by using a corresponding second switch.

Based on the connection relationship, it may be determined that the combiner box may be configured to combine a direct current generated by each photovoltaic module of the plurality of photovoltaic modules, and output the combined direct current to a corresponding inverter.

In another possible implementation, the direct current power supply may be an energy storage battery. In other words, the energy storage battery may also supply a direct current to the integration system.

Certainly, in addition to the photovoltaic module means and the energy storage battery, the direct current power supply may be another device that can supply the direct current to the integration system. This is not limited in this application.

DETAILED DESCRIPTION OF ILLUSTRATIVE EMBODIMENTS

Figure 1:
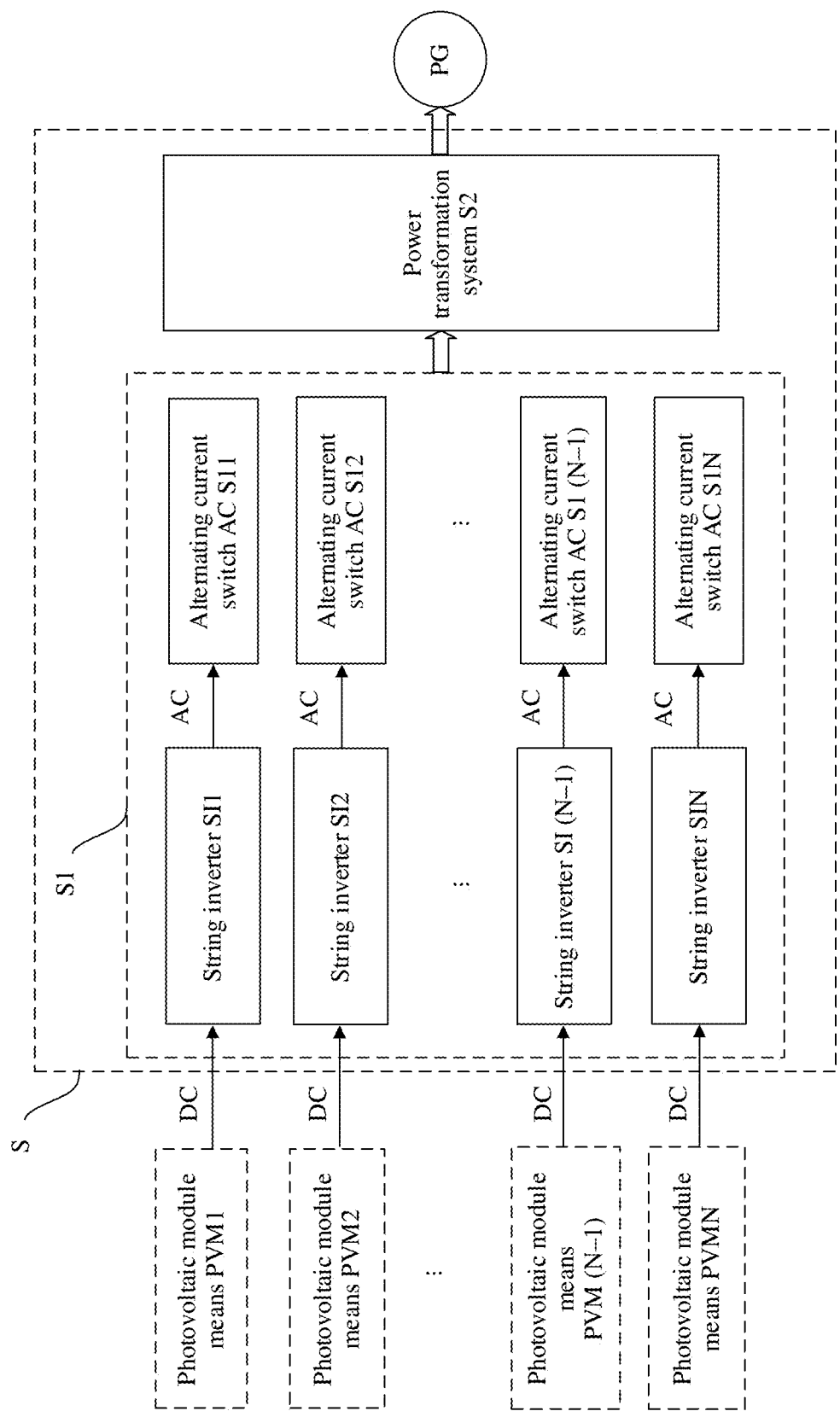
FIG. 1 is a schematic diagram of a structure of a power generation system S according to an embodiment of this application.

The following describes technical solutions of this application with reference to accompanying drawings.

To make the objectives, technical solutions, and advantages of this application clearer, the following clearly and describes the technical solutions in this application with reference to the accompanying drawings in this application. Obviously, the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

With the rapid development of science and technology, new energy represented by solar energy has been widely used. Solar photovoltaic (that is, a photovoltaic (PV) module) is a power generation apparatus that can convert solar energy into a direct current DC. A plurality of photovoltaic modules may be connected to a same combiner box (CB) or a same switch box (SB), to form a photovoltaic module (PVM) means.

Generally, a direct current power supply such as a plurality of photovoltaic module means may be connected to a power grid (PG) by using a power generation system, to connect the plurality of direct current power supplies to the power grid.

The direct current power supply may be the photovoltaic module means or an energy storage battery. Certainly, the direct current power supply may alternatively be another device that may supply the direct current to an integration system. This is not limited in this embodiment of this application. This embodiment of this application uses the photovoltaic module means as an example for description.

To connect the plurality of photovoltaic module means to the power grid, this embodiment of this application provides a power generation system. As shown in FIG. 1, a power generation system S may connect N photovoltaic module means (that is, a photovoltaic module means PVM1, a photovoltaic module means PVM2, ..., a photovoltaic module means PVM (N−1), and a photovoltaic module means PVMN, a total of N photovoltaic module means in FIG. 1) to a power grid PG.

Optionally, the power generation system S may include an integration system S1 and a power transformation system S2. The integration system S1 may include a direct current input terminal and a first alternating current output terminal. The power transformation system S2 may include an alternating current input terminal and a second alternating current output terminal.

The direct current input terminal of the integration system S1 may be connected to the N photovoltaic module means, the first alternating current output terminal of the integration system S1 may be connected to the alternating current input terminal of the power transformation system S2, and the second alternating current output terminal of the power transformation system S2 may be connected to the power grid.

Further, the integration system S1 may include N inverters (may be string inverters (SI), that is, a string inverter SI1, a string inverter SI2, ..., a string inverter SI (N−1), and a string inverter SIN in FIG. 1, a total of N string inverters), and N first switches (may be a plurality of alternating current switches (AC Ss), that is, an alternating current switch AC S11, an alternating current switch AC S12, ..., an alternating current switch AC S1 (N−1), and an alternating current switch AC S1N, a total of N alternating current switches in FIG. 1.)

It should be noted that each string inverter may have a function of maximum power point tracking (MPPT) of a plurality of inputs. Compared with a central inverter that has MPPT of one or two inputs, the string inverter may be flexibly configured and conveniently replaced. In addition, output power of the string inverter is higher than that of the central inverter. Therefore, this embodiment of this application gives full play to advantages of the string inverter, and facilitates maintenance of the entire integration system S1 (that is, the power generation system S).

Certainly, the inverter in the integration system S1 may alternatively be another type of inverter. This is not limited in this embodiment of this application.

Optionally, the alternating current switch AC S11, the alternating current switch AC S12, ..., the alternating current switch AC S1 (N−1), and the alternating current switch AC S1N may be an alternating current circuit breaker or an alternating current fuse. Alternatively, another device configured to isolate and protect the string inverter and the power transformation system S2 may be used. This is not limited in this embodiment of this application.

Optionally, the N string inverters may be connected in series to the N photovoltaic module means and the N alternating current switches in a one-to-one correspondence.

For example, the string inverter SI1 may be connected in series to the photovoltaic module means PVM1 and the alternating current switch AC S11 in a one-to-one correspondence (it may indicate that there is a series connection relationship among the string inverter SI1, the photovoltaic module means PVM1, and the alternating current switch AC S11).

For another example, the string inverter SI2 may be connected in series to the photovoltaic module means PVM2 and the alternating current switch AC S12 a one-to-one correspondence (it may indicate that there is a series connection relationship among the string inverter SI2, the photovoltaic module means PVM2, and the alternating current switch AC S12).

As shown in FIG. 1, an input terminal (that is, a direct current side of the string inverter) of each string inverter of the N string inverters is connected to a corresponding photovoltaic module means, and an output terminal (that is, an alternating current side of the string inverter SI1) of each string inverter is connected to a corresponding alternating current switch.

For example, an input terminal of the string inverter SI1 is connected to the photovoltaic module means PVM1, and an output terminal of the string inverter SI1 is connected to one terminal of the alternating current switch AC S11.

For another example, an input terminal of the string inverter SI2 is connected to the photovoltaic module means PVM2, and an output terminal of the string inverter SI2 is connected to one terminal of the alternating current switch AC S12.

For still another example, an input terminal of the string inverter SI1 (N−1) is connected to the photovoltaic module means PVM (N−1), and an output terminal of the string inverter SI1 (N−1) is connected to one terminal of an alternating current switch AC S1 (N−1).

For yet another example, an input terminal of the string inverter SIN is connected to the photovoltaic module means PVMN, and an output terminal of the string inverter SIN is connected to one terminal of the alternating current switch AC S1N.

Based on the foregoing connection relationship, it may be further determined that each string inverter may be configured to convert a direct current DC from a corresponding photovoltaic module means into an alternating current (AC), and output the alternating current to a corresponding alternating current switch.

For example, the string inverter SI1 may be configured to convert a direct current DC from the photovoltaic module means PVM1 into an alternating current AC, and output the alternating current AC to a corresponding alternating current switch AC S11.

For another example, the string inverter SI2 may be configured to: convert a direct current DC from the photovoltaic module means PVM2 into an alternating current AC, and output the alternating current AC to a corresponding alternating current switch AC S12.

For still another example, the string inverter SI1 (N−1) may be configured to: convert a direct current DC from the photovoltaic module means PVM (N−1) into an alternating current AC, and output the alternating current AC to a corresponding alternating current switch AC S1 (N−1).

For yet another example, the string inverter SIN may be configured to: convert a direct current DC from the photovoltaic module means PVMN into an alternating current AC, and output the alternating current AC to a corresponding alternating current switch AC S1N.

It may be further determined, based on the foregoing connection relationship, that the N alternating current switches may be configured to: combine alternating currents from corresponding string inverters, output the combined alternating current to the power transformation system S2, and isolate the N string inverters from the power transformation system S2. The power transformation system S2 may be configured to adjust a voltage value of the alternating currents combined by the N alternating current switches and output the voltage value to the power grid PG.

In an example, there are two cases in which the N string inverters are isolated from the power transformation system S2 by using the N alternating current switches:

Case 1: If a string inverter corresponding to any one of the N alternating current switches is faulty and/or the power transformation system S2 is faulty, the alternating current switch may be turned off based on a first control instruction from a collection module in the power generation system S. The first control instruction instructs to turn off the alternating current switch.

Case 2: If a string inverter corresponding to any one of the N alternating current switches is faulty and/or the power transformation system S2 is faulty, the alternating current switch is automatically turned off.

It should be noted that, in the two cases, the string inverter corresponding to the alternating current switch may be isolated from the power transformation system S2, to avoid fault escalation and protect the string inverter and the power transformation system S2.

It can be learned from the foregoing correspondence relationship and connection relationship between the N alternating current switches and the N string inverters that, when any one of the N alternating current switches is turned on, an alternating current output from a corresponding string inverter may be output (output to the power transformation system, referring to the following content). In addition, when any one of the N alternating current switches is turned off, the corresponding string inverter may be isolated from the power transformation system, to protect the string inverter and the power transformation system.

Through the power generation system S shown in FIG. 1 in this embodiment of this application, a plurality of photovoltaic module means may be connected to the power grid by using a plurality of inverters and the plurality of alternating current switches, and a quantity of the photovoltaic module means is not limited. Therefore, a high-power (for example, 8 MW) photovoltaic system that is formed by the plurality of photovoltaic module means may be connected to the power grid.

Figure 2:
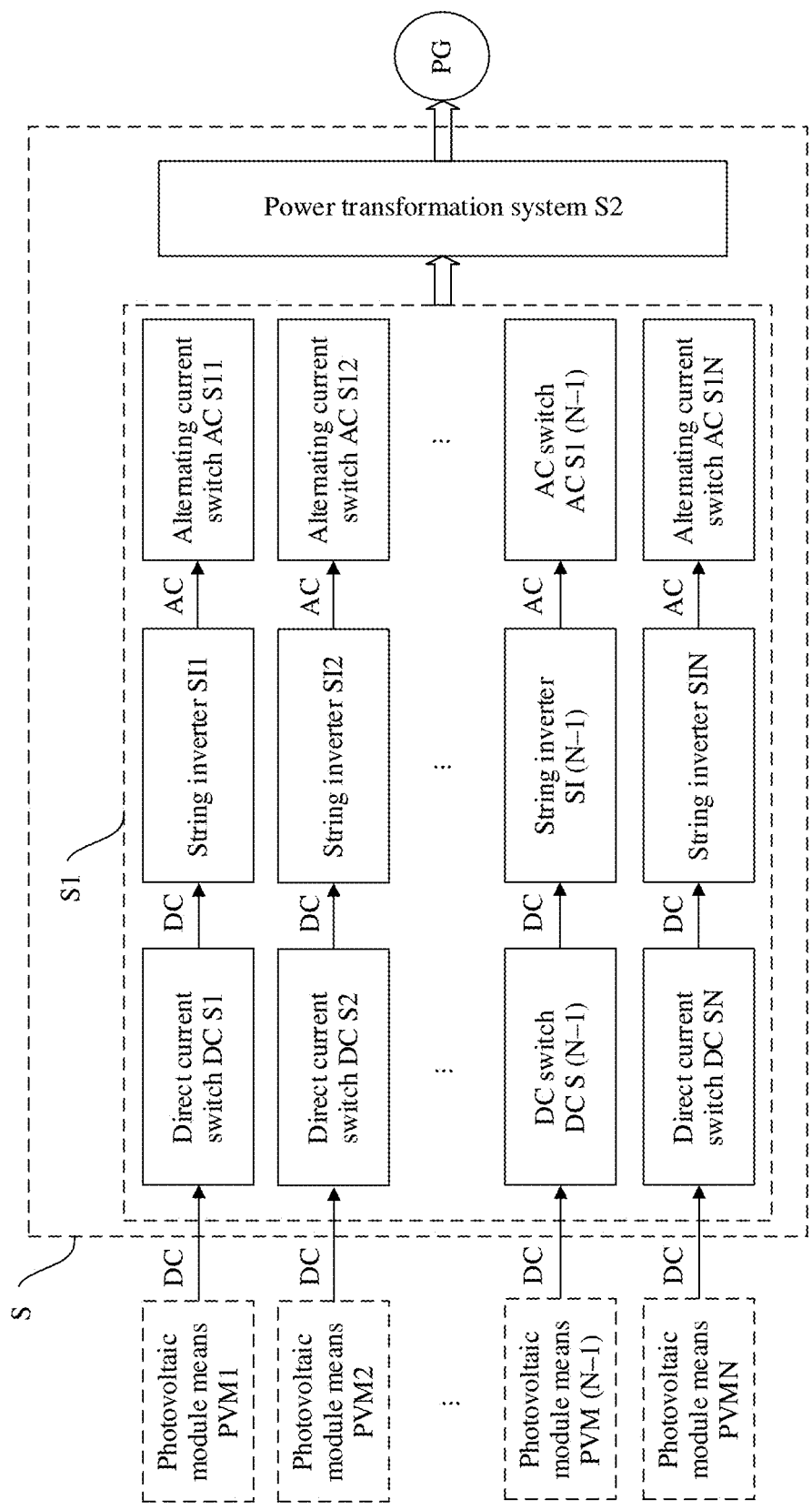
FIG. 2 is a schematic diagram of a structure of a power generation system S according to an embodiment of this application.

In a possible implementation, as shown in FIG. 2, the integration system S1 may further include N second switches (may be direct current switches (DC S), that is, a direct current switch DC S1, a direct current switch DC S2, ..., a direct current switch DC S (N−1), and a direct current switch DC SN shown in FIG. 2).

Optionally, the direct current switch DC S1, the direct current switch DC S2, ..., the direct current switch DC S (N−1), and the direct current switch DC SN may be a direct current circuit breaker or a direct current fuse, or may be another device configured to isolate and protect the photovoltaic module means and the string inverter. This is not limited in this embodiment of this application.

Optionally, N direct current switches may be connected in series to the N photovoltaic module means and the N string inverters in a one-to-one correspondence.

For example, the direct current switch DC S1 may be connected in series to the photovoltaic module means PVM1 and the string inverter SI1 in a one-to-one correspondence (it may indicate that there is a series connection relationship among the direct current switch DC S1, the photovoltaic module means PVM1, and the string inverter SI1).

For another example, the direct current switch DC S2 may be connected in series to the photovoltaic module means PVM2 and the string inverter SI2 in a one-to-one correspondence (it may indicate that there is a series connection relationship among the direct current switch DC S2, the photovoltaic module means PVM2, and the string inverter SI2).

For still another example, the direct current switch DC S (N−1) may be connected in series to a photovoltaic module means PVM (N−1) and the string inverter SI1 (N−1) in a one-to-one correspondence (it may indicate that there is a series connection relationship among the direct current switch DC S (N−1), the photovoltaic module means PVM (N−1), and the string inverter SI1 (N−1).

For yet another example, the direct current switch DC SN may be connected in series to the photovoltaic module means PVMN and the string inverter SIN in a one-to-one correspondence (it may indicate that there is a series connection among the direct current switch DC SN, the photovoltaic module means PVMN, and the string inverter SIN).

As shown in FIG. 2, one terminal of each direct current switch of the N direct current switches may be connected to a corresponding photovoltaic module means, and the other terminal of each direct current switch may be connected to an input terminal of a corresponding string inverter.

For example, one terminal of the direct current switch DC S1 may be connected to the photovoltaic module means PVM1, and the other terminal of the direct current switch DC S1 may be connected to the input terminal of the string inverter SI1.

For another example, one terminal of the direct current switch DC S2 may be connected to the photovoltaic module means PVM2, and the other terminal of the direct current switch DC S2 may be connected to the input terminal of the string inverter SI2.

For still another example, one terminal of the direct current switch DC S (N−1) may be connected to the photovoltaic module means PVM (N−1), and the other terminal of the direct current switch DC S (N−1) may be connected to an input terminal of the string inverter SI1 (N−1).

For yet another example, one terminal of the direct current switch DC SN may be connected to the photovoltaic module means PVMN, and the other terminal of the direct current switch DC SN may be connected to the input terminal of the string inverter SIN.

It may be determined, based on the foregoing connection relationship, that the N direct current switches may be configured to isolate a corresponding photovoltaic module means from a corresponding inverter.

Optionally, similar to the alternating current switch, there are two cases in which the direct current switch isolates the corresponding photovoltaic module means from the corresponding inverter:

Case 1: If a photovoltaic module means is faulty and/or a string inverter corresponding to any one of the N direct current switches is faulty, the direct current switch may be turned off based on a second control instruction of the collection module. The second control instruction instructs to turn off the direct current switch.

Case 2: If a photovoltaic module means is faulty and/or a string inverter corresponding to any one of the N direct current switches is faulty, the direct current switch is automatically turned off.

It should be noted that, in the two cases, the photovoltaic module means corresponding to the direct current switch may be isolated from the corresponding string inverter, to avoid fault escalation and protect the photovoltaic module means and the string inverter.

It can be learned from the foregoing correspondence and connection relationship between the N direct current switches and the N photovoltaic module means and between the N direct current switches and the N string inverters that, when any one of the N direct current switches is turned on, a direct current generated by the corresponding photovoltaic module means may be transmitted to a corresponding string inverter, and when any one of the N direct current switches is turned off, a corresponding photovoltaic module means may be isolated from a corresponding string inverter, to protect the photovoltaic module means and the string inverter.

Figure 3:
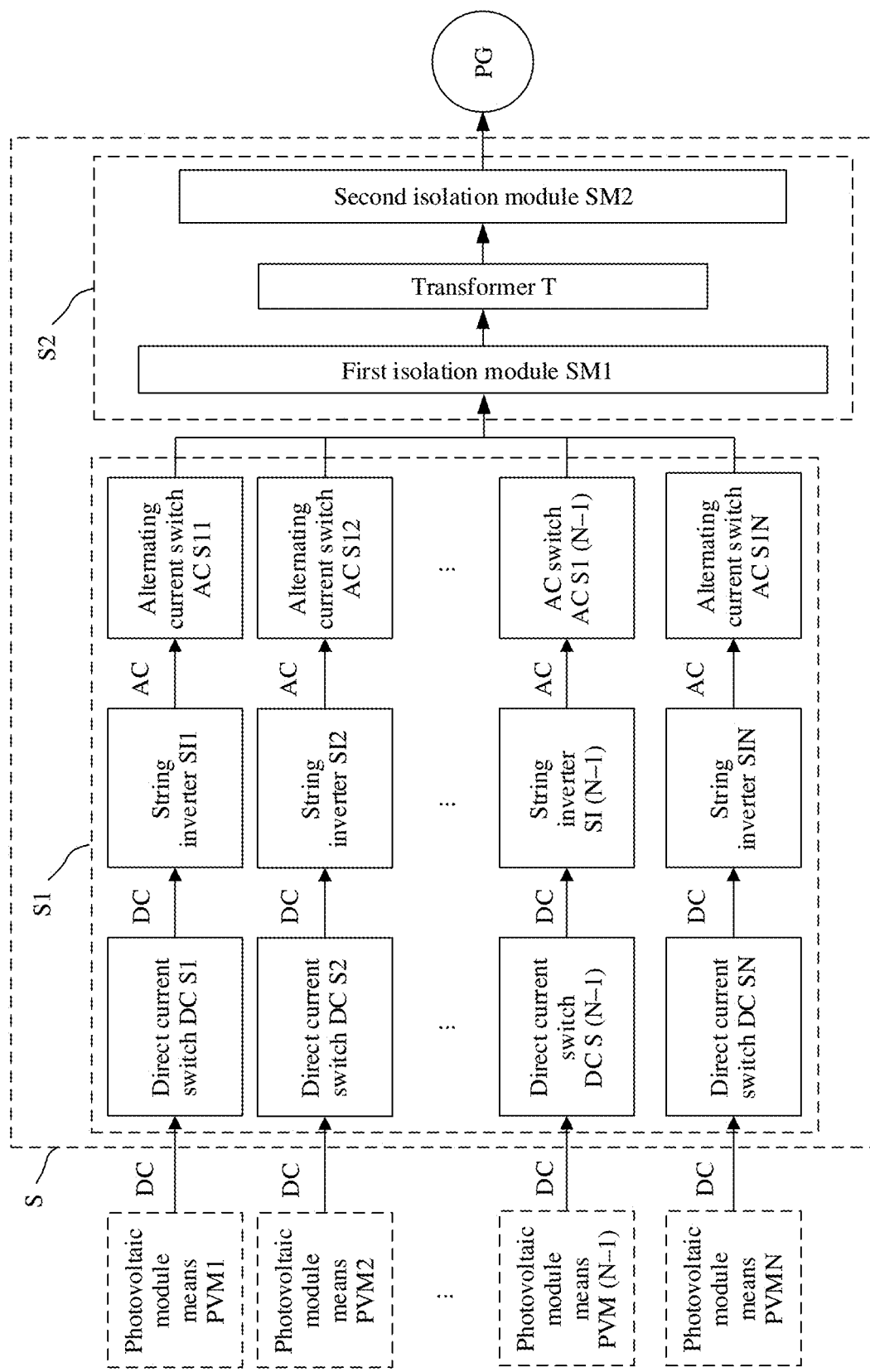
FIG. 3 is a schematic diagram of a structure of a power generation system S according to an embodiment of this application.

In a possible implementation, as shown in FIG. 3, an alternating current input terminal (that is, an input terminal of a first isolation module (SM) 1 in the following description) of the power transformation system S2 may be connected to each alternating current switch of the N alternating current switches, and a second alternating current output terminal (that is, an output terminal of a second isolation module SM2 in the following description) of the power transformation system S2 is connected to the power grid PG.

Still refer to FIG. 3. The power transformation system S2 may include a first isolation module SM1, a transformer T (transformer), and the second isolation module SM2.

In a possible implementation, an input terminal of the first isolation module SM1 (that is, the alternating current input terminal of the power transformation system S2) may be connected to each alternating current switch of the plurality of alternating current switches, and an output terminal of the first isolation module SM1 may be connected to an input terminal of the transformer T, an output terminal of the transformer T may be connected to an input terminal of the second isolation module SM2, and an output terminal of the second isolation module SM2 (that is, the second alternating current output terminal of the power transformation system S2) may be connected to the power grid PG.

Optionally, the output terminal of the second isolation module SM2 may be connected to the power grid PG by using an alternating current cable.

It can be learned that in this embodiment of this application, wiring between the power transformation system S2 (that is, the second isolation module SM2) and the power grid is simple, and the power transformation system S2 may be connected to the power grid by using only the alternating current cable. This facilitates operation and maintenance of the power generation system S.

Based on the connection relationship, it may be determined that:

The first isolation module SM1 may be configured to: transmit an alternating current transmitted by each alternating current switch (that is, an alternating current of the string inverter) to the transformer T, and isolate each alternating current switch (that is, the integration system S1) from the transformer T.

Further, the transformer T may be configured to adjust (for example, boost) an alternating current from the first isolation module SM1, and output the adjusted alternating current to the second isolation module SM2.

Still further, the second isolation module SM2 is configured to transmit the adjusted alternating current to the power grid PG, and isolate the transformer T from the power grid PG.

Optionally, the transformer T in this embodiment of this application may be a pillow transformer or a corrugated transformer. However, the pillow transformer or the corrugated transformer may be a three-winding transformer. In other words, the transformer T may include two primary-side windings (that is, a primary-side winding T11 and a primary-side winding T12 in FIG. 4) and one secondary-side winding (that is, a secondary-side winding T13 in FIG. 4). Certainly, a transformer of another structure may alternatively be used. This is not limited in this embodiment of this application.

Figure 4:
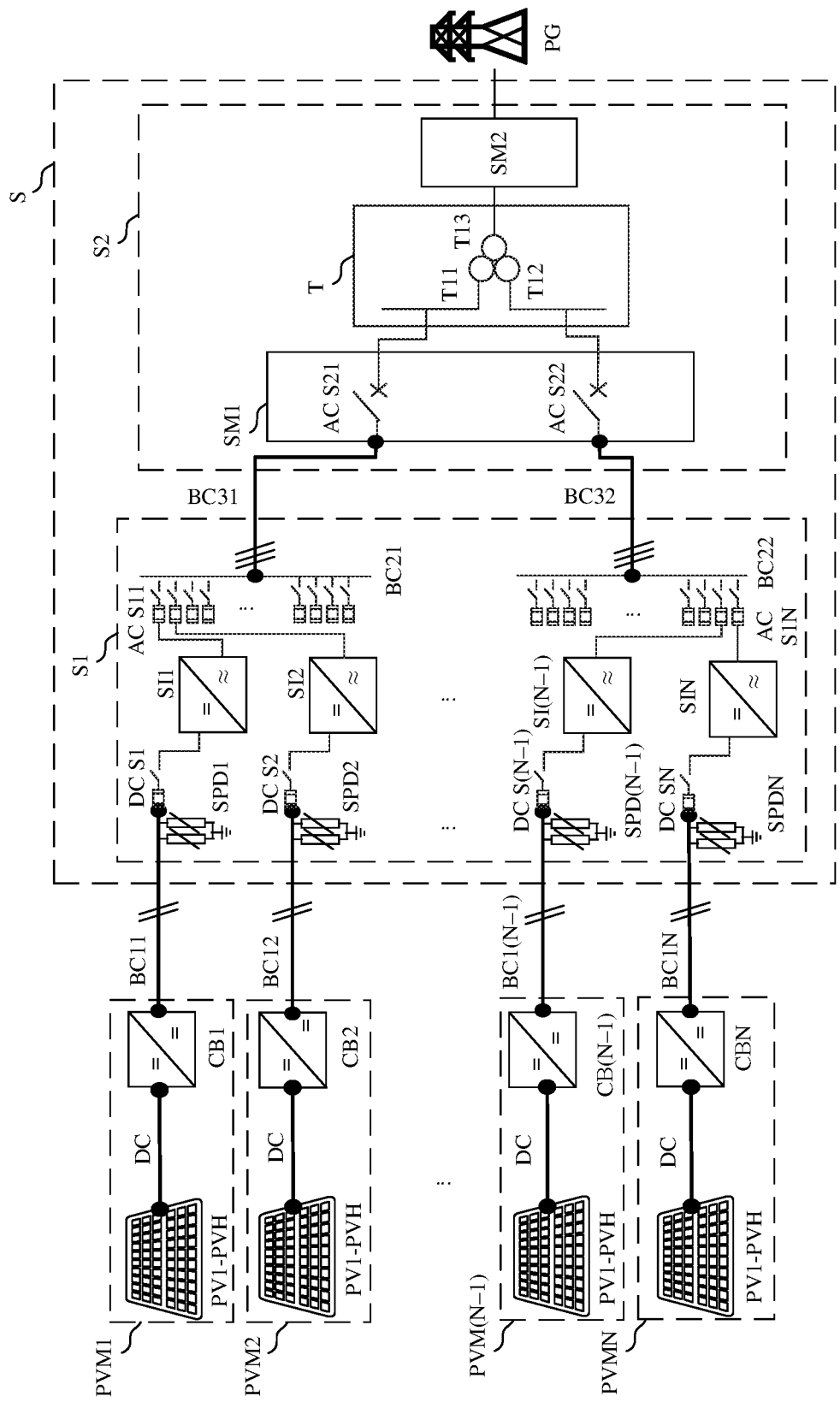
FIG. 4 is a schematic diagram of a structure of a power generation system S according to an embodiment of this application.

Because the transformer T in this embodiment of this application uses the three-winding transformer, the first isolation module SM1 may be provided with two alternating current main switches (that is, an alternating current main switch AC S21 and an alternating current main switch AC S22 in FIG. 4). Certainly, in addition to the two alternating current main switches, the first isolation module SM1 may further include a power distribution switch, a temperature and humidity controller, a measurement and control apparatus, and the like.

It may be understood that the alternating current main switch AC S21 and the alternating current main switch AC S22 belong to the first isolation module SM1, and are disposed between all string inverters and the transformer T in the integration system S1. Therefore, the alternating current main switch AC S21 and the alternating current main switch AC S22 may be configured to isolate all the string inverters from the transformer T, to protect all the string inverters and the transformer T.

For example, when the transformer T is faulty, the alternating current main switch AC S21 and/or the alternating current main switch AC S22 in the first isolation module SM1 may be turned off based on a third control instruction (instruct to turn off the alternating current main switch AC S21 and/or the alternating current main switch AC S22) from the collection module, to prevent the fault from being escalated to the string inverter, and avoid damage to the string inverter. Certainly, if the string inverter is faulty, the alternating current main switch AC S21 and/or the alternating current main switch AC S22 may be turned off based on the third control instruction from the collection module, to prevent the fault from being escalated to the transformer T, and avoid damage to the transformer T.

Certainly, when the transformer T is faulty and/or the string inverter is faulty, the alternating current main switch AC S21 and/or the alternating current main switch AC S22 may also be automatically turned off, to isolate the transformer T from the string inverter.

It can be learned that, the integration system S1 (that is, the string inverter in the integration system S1) may be isolated from the transformer T by using only the alternating current main switch AC S21 and the alternating current main switch AC S22 in the first isolation module SM1. Therefore, an isolation manner is simple and reliability is high.

It may be further understood that, the second isolation module SM2 is disposed between the transformer T and the power grid PG. Therefore, the second isolation module may be configured to isolate the power grid PG from the transformer T, to protect the transformer T and the power grid PG.

For example, when the transformer T is faulty, the alternating current switch in the second isolation module SM2 may be turned off based on a fourth control instruction (instruct to turn off the alternating current switch in the second isolation module SM2) from the collection module, to prevent the fault from being escalated to the power grid PG, and avoid damage to another device in the power grid PG. Certainly, if the another device in the power grid PG is faulty, the alternating current switch in the second isolation module SM2 may be turned off based on the fourth control instruction from the collection module, prevent the fault from escalated to the transformer T, and avoid the damage to the transformer T.

Certainly, when the transformer T is faulty and/or the another device in the power grid PG is faulty, the alternating current switch in the second isolation module SM2 may be automatically turned off, to isolate the transformer T from the another device in the power grid PG.

It can be learned that the power transformation system S2 (that is, the transformer T in a power transformation system S1) may be isolated from the power grid by using only the alternating current switch in the second isolation module SM2. An isolation manner is simple and the reliability is high.

In an example, as shown in FIG. 4, each direct current switch is connected to a corresponding photovoltaic module means by using a first bonding conductor (BC) 1.

For example, one terminal of the direct current switch DC S1 is connected to the photovoltaic module means PVM1 by using a first bonding conductor BC11.

For another example, one terminal of the direct current switch DC S2 is connected to the photovoltaic module means PVM2 by using a first bonding conductor BC12.

For still another example, one terminal of the direct current switch DC S (N−1) is connected to the photovoltaic module means PVM (N−1) by using a first bonding conductor BC1 (N−1).

For yet another example, one terminal of the direct current switch DC SN is connected to the photovoltaic module means PVMN by using a first bonding conductor BC1N.

Optionally, the first bonding conductor BC11 may be connected to the first bonding conductor BC1N by using a direct current cable. In other words, the direct current switch may be connected to the photovoltaic module means (that is, a combiner box in the photovoltaic module means, refer to the following description) by using the direct current cable.

It can be learned that in this embodiment of this application, the integration system S1 may be connected to the photovoltaic module means by using only a direct current cable (that is, from the first bonding conductor BC11 to the first bonding conductor BC1N). In other words, each string inverter in the integration system S1 may be connected to a corresponding photovoltaic module means by using the direct current cable. This avoids complex onsite construction and installation between the string inverter and the corresponding photovoltaic module means, avoids complex cabling and layout between the string inverter and the corresponding photovoltaic module means, and facilitates maintenance of the power generation system.

On the basis of FIG. 3, the integration system S1 may further include N surge protection devices (SPD). Refer to FIG. 4. Each surge protection device of the N surge protection devices is connected to a corresponding first bonding conductor.

For example, a surge protection device SPD1 may be connected to the first bonding conductor BC11 between the direct current switch DC S1 and the photovoltaic module means PVM1.

For another example, a surge protection device SPD2 may be connected to the first bonding conductor BC12 between the direct current switch DC S2 and the photovoltaic module means PVM2.

For still another example, a surge protection device SPD (N−1) may be connected to a first bonding conductor BC1 (N−1) between a direct current switch DC S (N−1) and the photovoltaic module means PVM (N−1).

For yet another example, a surge protection device SPDN may be connected to the first bonding conductor BC1N between the direct current switch DC SN and the photovoltaic module means PVMN.

It should be noted that the surge protection device may be configured to prevent the string inverter from being damaged by a surge overvoltage. The surge protection device may be a lightning arrester or a surge protector. Certainly, the surge protection device may alternatively be another type of device configured to protect the string inverter. This is not limited in this embodiment of this application.

In another example, the first isolation module SM1 includes a total of two alternating current main switches: the alternating current main switch AC S21 and the alternating current main switch AC S22, so that the integration system S1 may further include two second bonding conductors BC2 (that is, a second bonding conductor BC21 and a second bonding conductor BC22 in FIG. 4).

Therefore, the input terminal of the first isolation module SM1 (that is, the alternating current input terminal of the power transformation system S2, that is, input terminals of the alternating current main switch AC S21 and the alternating current main switch AC S22) is connected to the second bonding conductors BC2 (that is, the second bonding conductor BC21 and the second bonding conductor BC22) by using two third bonding conductors BC3 (that is, a third bonding conductor BC31 and a third bonding conductor BC32).

In other words, an input terminal of the alternating current main switch AC S21 is connected to the second bonding conductor BC21 by using the third bonding conductor BC31. An input terminal of the alternating current main switch AC S22 is connected to the second bonding conductor BC22 by using the third bonding conductor BC32.

Optionally, the second bonding conductor BC21, the second bonding conductor BC22, the third bonding conductor BC31, and the third bonding conductor BC32 may be a soft connection busbar. A soft connection between the integration system S1 and the power transformation system S2 may be implemented by using the soft connection busbar, to facilitate assembly between the integration system S1 and the power transformation system S2.

Therefore, one terminal of the alternating current switch AC S11 is connected to the output terminal of the string inverter SI1 (that is, the alternating current side of the string inverter SI1), the other terminal of the alternating current switch AC S11 is connected to one terminal of the second bonding conductor BC21 (that is, a hard bonding terminal of the second bonding conductor BC21), the other terminal (that is, a soft connection terminal of the second bonding conductor BC21) of the second bonding conductor BC21 is connected to one terminal (that is, a soft connection terminal of the third bonding conductor BC31) of the third bonding conductor BC31, the other terminal (that is, a hard bonding terminal of the third bonding conductor BC31) of the third bonding conductor BC31 is connected to one terminal of the alternating current main switch AC S21, and the other terminal of the alternating current main switch AC S21 is connected to the primary-side winding T11.

Similar to the connection relationship, one terminal of the alternating current switch AC S1 (N−1) is connected to the output terminal of the string inverter SI (N−1) (that is, an alternating current side of the string inverter SI (N−1)), the other terminal of the alternating current switch AC S1 (N−1) is connected to one terminal (that is, a hard bonding terminal of the second bonding conductor BC22) of the second bonding conductor BC22, the other terminal (that is, a soft connection terminal of the second bonding conductor BC22) of the second bonding conductor BC22 is connected to one terminal of the third bonding conductor BC32 (that is, a soft connection terminal of the third bonding conductor BC32), the other terminal (that is, a hard bonding terminal of the third bonding conductor BC32) of the third bonding conductor BC32 is connected to one terminal of the alternating current main switch AC S22, and the other terminal of the alternating current main switch AC S22 is connected to the primary-side winding T12.

It should be noted that, a portion of the N alternating current switches (that is, the alternating current switch AC S1 to the alternating current switch AC SN) may be connected to the second bonding conductor BC21, and the rest of the N alternating current switches (that is, the alternating current switch AC S1 to the alternating current switch AC SN) may be connected to the second bonding conductor BC22.

Based on the connection relationship, it may be determined that the second bonding conductor BC21 may be configured to: combine alternating currents of the portion of alternating current switches, and transmit the combined alternating current to the power transformation system S2 by using the third bonding conductor BC31 (may be the alternating current main switch AC S21 in the first isolation module SM1). Similarly, the second bonding conductor BC22 may be configured to: combine alternating currents of the rest of the alternating current switches, and transmit the combined alternating current to the power transformation system S2 by using the third bonding conductor BC32 (may be the alternating current main switch AC S22 in the first isolation module SM1).

It may be understood that the integration system S1 may simultaneously combine direct currents from different photovoltaic module means and combine alternating currents from different string inverters.

In an example, each photovoltaic module means may include a plurality of photovoltaic modules (photovoltaic, PV) and one combiner box CB. H photovoltaic modules may be connected to the combiner box CB by using a direct current cable.

For example, the photovoltaic module means PVM1 may include a total of H photovoltaic modules: a photovoltaic module PV1 to a photovoltaic module PVH, and a combiner box CB1.

For another example, the photovoltaic module means PVM2 may include a total of H photovoltaic modules: the photovoltaic module PV1 to the photovoltaic module PVH, and a combiner box CB2.

It should be noted that a quantity of photovoltaic modules in the photovoltaic module means may be equal or unequal. This embodiment of this application uses an example in which each photovoltaic module means includes H photovoltaic modules.

Further, an output terminal of each photovoltaic module of the plurality of photovoltaic modules is connected to an input terminal of the combiner box CB, and an output terminal of the combiner box may be connected to an input terminal (that is, a direct current side of the string inverter) of a corresponding string inverter by using a corresponding direct current switch.

For example, output terminals of the photovoltaic module PV1 to the photovoltaic module PVH in the photovoltaic module means PVM1 are connected to an input terminal of the combiner box CB1. An output terminal of the combiner box CB1 may be connected to the input terminal (that is, a direct current side of the string inverter SI1) of the string inverter S1 through the direct current switch DC S1.

For another example, output terminals of the photovoltaic module PV1 to the photovoltaic module PVH in the photovoltaic module means PVM2 are connected to an input terminal of the combiner box CB2, an output terminal of the combiner box CB2 may be connected to the input terminal (that is, a direct current side of the string inverter SI2) of the string inverter SI2 through the direct current switch DC S2.

Based on the connection relationship, it may be determined that the combiner box (may be any combiner box of the combiner box CB1 to a combiner box CBN) may be configured to: combine direct currents DC generated by all of the plurality of photovoltaic modules (that is, the photovoltaic module PV1 to the photovoltaic module PVH), and output the combined direct current to a corresponding string inverter.

For example, the combiner box CB1 may combine direct currents DC generated by the photovoltaic module PV1 to the photovoltaic module PVH in the photovoltaic module means PVM1, and output the combined direct current DC to the string inverter SI1. In addition, the combiner box CB1 has a function of maximum power point tracking MPPT.

For another example, the combiner box CB2 may combine direct currents DC generated by the photovoltaic module PV1 to the photovoltaic module PVH in the photovoltaic module means PVM2, and output the combined direct current to the string inverter SI2.

Figure 5:
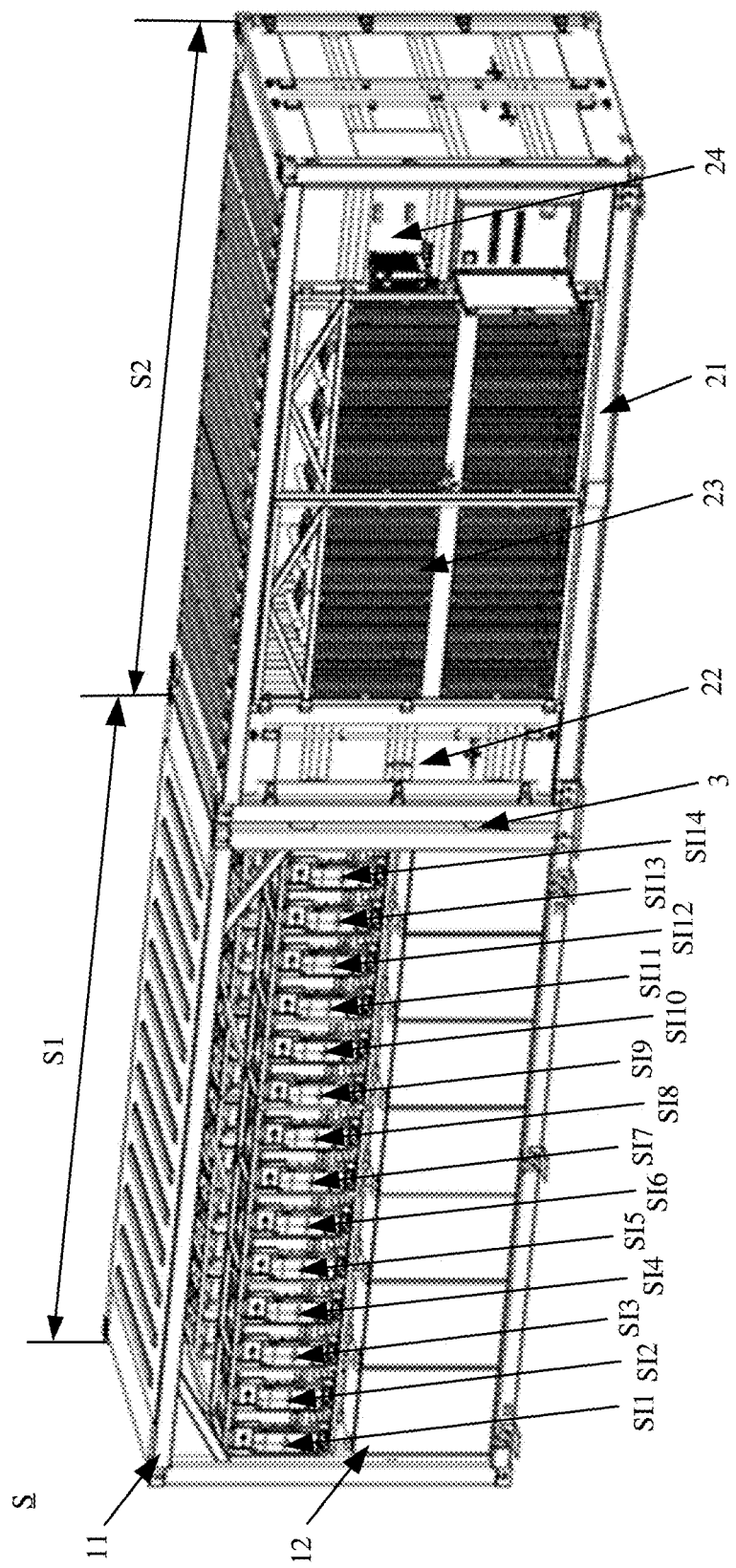
FIG. 5 is a schematic diagram of a structure of a power generation system S according to an embodiment of this application.

In a possible implementation, as shown in FIG. 5, the power transformation system S may include the integration system S1 and the power transformation system S2.

Further, the integration system S1 may include a plurality of string inverters (that is, the string inverter SI1, the string inverter SI2, a string inverter SI3, a string inverter SI4, a string inverter SI5, a string inverter SI6, a string inverter SI7, a string inverter SI8, a string inverter SI9, a string inverter SI10, a string inverter SI11, a string inverter SI12, a string inverter SI13, and a string inverter SI14, a total of 14 string inverters shown in FIG. 5) and a plurality of power distribution boxes (it can be learned from FIG. 5 that there are seven power distribution boxes 12).

Two direct current switches (not shown in FIG. 5) and two alternating current switches (not shown in FIG. 5) are disposed inside each power distribution box 12. The two direct current switches and the two alternating current switches correspond to two string inverters, and are connected to corresponding string inverters.

For example, the direct current switch DC S1, the direct current switch DC S2, the alternating current switch AC S11, and the alternating current switch AC S12 are disposed in the power distribution box 12 on the leftmost side in FIG. 5.

The direct current switch DC S1 and the alternating current switch AC S11 are connected in series to the string inverter SI1 in a one-to-one correspondence, and the direct current switch DC S2 and the alternating current switch AC S12 are connected in series to the string inverter SI2 in a one-to-one correspondence. In addition, the direct current switch DC S1 is connected to the direct current side of the string inverter SI1, and the alternating current switch AC S11 is connected to the alternating current side of the string inverter SI1. The direct current switch DC S2 is connected to the direct current side of the string inverter SI2, and the alternating current switch AC S12 is connected to an alternating current side of the string inverter SI2.

Optionally, the 14 string inverters may be disposed in a drawer-type installation manner or in another installation manner. This is not limited in this embodiment of this application.

In an example, an alternating current switch disposed inside the power distribution box 12 may be an alternating current circuit breaker or an alternating current fuse, and a direct current switch disposed inside the power distribution box 12 may be a direct current circuit breaker or a direct current fuse. Certainly, the alternating current switch and the direct current switch may alternatively be another device configured to isolate and protect the string inverter. This is not limited in this embodiment of this application.

In another example, a surge protection device SPD may be further disposed inside the power distribution box 12. The surge protection device SPD may be configured to prevent the string inverter from being damaged by a surge overvoltage, and may be the lightning arrester or the surge protector, or another device configured to protect the string inverter. This is not limited in this embodiment of this application.

In still another example, a heat dissipation module may be further disposed inside the power distribution box 12. The heat dissipation module may be a heat exchanger module (heat exchanger module, HEM) or a fan module. Certainly, the heat dissipation module may alternatively be another device that can dissipate heat of the power distribution box 12. This is not limited in this embodiment of this application.

Still refer to FIG. 5. The power transformation system S2 may include a first power distribution cabinet 22 (that is, the first isolation module SM1 in FIG. 4), a transformer 23 (that is, the transformer T in FIG. 4), and a second power distribution cabinet 24 (that is, the second isolation module SM2 in FIG. 4).

Because a voltage value (for example, 380 V) of an alternating current obtained by converting, through the string inverter, a direct current output by the photovoltaic module means is usually lower than that (for example, 10 kV) of the power grid, the first power distribution cabinet 22 may be referred to as a low-voltage cabinet, and the second power distribution cabinet 24 may be referred to as a medium-voltage cabinet. After the first power distribution cabinet 22 transmits an alternating current output by the string inverter (that is, the alternating current output by the integration system S1) to the transformer 23, the transformer 23 needs to boost an alternating current transmitted by the first power distribution cabinet 22, and transmit the boosted alternating current to the power grid by using the second power distribution cabinet 24, so that a plurality of high-power photovoltaic module means may be connected to the power grid.

It can be understood that two alternating current main switches (that is, the alternating current main switch AC S21 and the alternating current main switch AC S22 in FIG. 4) may be disposed inside the first power distribution cabinet 22. Certainly, in addition to the two alternating current main switches, the first power distribution cabinet 22 may further include a power distribution switch, a temperature and humidity controller, a measurement and control apparatus, and the like.

It may also be understood that, because the first power distribution cabinet 22 is disposed between all the string inverters and the transformer 23 in the integration system S1, the first power distribution cabinet 22 (that is, the alternating current main switch AC S21 and the alternating current main switch AC S22) may be configured to isolate all the string inverters from the transformer 23, to protect all the string inverters and the transformer 23.

For example, when the transformer 23 is faulty, the alternating current main switch AC S21 and the alternating current main switch AC S22 in the first power distribution cabinet 22 may be turned off based on the third control instruction (instruct to turn off the alternating current main switch AC S21 and/or the alternating current main switch AC S22) from the collection module, to prevent the fault from being escalated to the string inverter in the integration system S1, and avoid the damage to the string inverter. Certainly, if the string inverter is faulty, the alternating current main switch AC S21 and the alternating current main switch AC S22 may be turned off based on the third control instruction from the collection module, to prevent the fault from being escalated to the transformer 23, and avoid damage to the transformer 23.

It may be further understood that the second power distribution cabinet 24 is disposed between the transformer 23 and the power grid. Therefore, the second power distribution cabinet 24 may be configured to isolate the power grid from the transformer 23, to protect the transformer 23 and the power grid.

For example, when the transformer 23 is faulty, the alternating current switch in the second power distribution cabinet 24 may be turned off based on the fourth control instruction (instruct to turn off the alternating current switch in the second power distribution cabinet 24) from the collection module, prevent the fault from being escalated to the power grid, and avoid the damage to the another device in the power grid. Certainly, if the another device in the power grid is faulty, the alternating current switch in the second power distribution cabinet 24 may be turned off based on the fourth control instruction from the collection module, to prevent the fault from being escalated to the transformer 23, and avoid the damage to the transformer 23.

In an example, the 14 string inverters (that is, the string inverter SI1 to the string inverter S114) and the seven power distribution boxes 12 in FIG. 5 may be disposed in a first integration framework 11 (belonging to the integration system S1). The first power distribution cabinet 22, the transformer 23, and the second power distribution cabinet 24 may be disposed in a second integration framework 21 (belonging to the power transformation system S2).

In this way, the first integration framework 11 on which the string inverters and the power distribution boxes are disposed may be disposed in a first cabinet, and the second integration framework 21 on which the first power distribution cabinet 22, the transformer 23, and the second power distribution cabinet 24 are disposed may be disposed in a second cabinet.

Therefore, the first cabinet and the second cabinet may be connected by using a distance block 3. In other words, the distance block 3 may be configured to connect the first cabinet and the second cabinet.

Optionally, the first cabinet and the second cabinet may be a container, or may be a skid (skid). Certainly, the first cabinet and the second cabinet may alternatively be in another form. This is not limited in this embodiment of this application.

For example, the third bonding conductor BC31 (may be referred to as a soft connection busbar P) and the third bonding conductor BC32 (may be referred to as a soft connection busbar Q) in FIG. 4 may be considered as a central channel between a first connection cabinet A (may also be referred to as the integration system S1) and a second connection cabinet (may also be referred to as the power transformation system S2).

Therefore, a soft connection terminal of the soft connection busbar P is connected to the soft connection terminal of the second bonding conductor BC21 (not shown in FIG. 5) that is disposed in the integration system S1, and a hard bonding terminal of the soft connection busbar P is connected to the alternating current main switch DC S21 in the first power distribution cabinet 22.

Similar to the soft connection busbar P, a soft connection terminal of the soft connection busbar Q is connected to the soft connection terminal of the second bonding conductor BC22 (not shown in FIG. 5) that is disposed in the integration system S1, and a hard bonding terminal of the soft connection busbar Q is connected to the alternating current main switch AC S22 in the first power distribution cabinet 22.

For example, the central channel (that is, the soft connection busbar P and the soft connection busbar Q) may be protected by using silicon rubber. For example, the silicon rubber may be sleeved on the central channel, one terminal of the silicon rubber is fastened to a flange (not shown in FIG. 5) of the power transformation system S1, and the other terminal of the silicon rubber is fastened to a flange (not shown in FIG. 5) of the first power distribution cabinet 22.

To further protect the central channel, a protection cover (may be a sheet metal protection cover) may be sleeved on an outer side of the silicon rubber, and the protection cover is fastened, to meet requirements of waterproof, dust-proof, and corrosion-proof between the integration system S1 and the power generation system S2.

Optionally, the power generation system S shown in FIG. 5 may integrate a plurality of collection modules. The collection module may include a temperature sensor, a voltage sensor, and a current sensor. The temperature sensor may be configured to collect temperatures of the primary-side winding and the secondary-side winding in the transformer 23, and an oil temperature of the transformer 23. The voltage sensor may be configured to collect a voltage of the string inverter, and the current sensor may be configured to collect a current of the string inverter.

Therefore, a communication unit between the integration system S1 and the power transformation system S2 may be implemented based on the temperature of the primary-side winding, the temperature of the secondary-side winding, the oil temperature of the transformer 23, the voltage of the string inverter, and the current of the string inverter that are collected by the plurality of collection modules.

Figure 6:
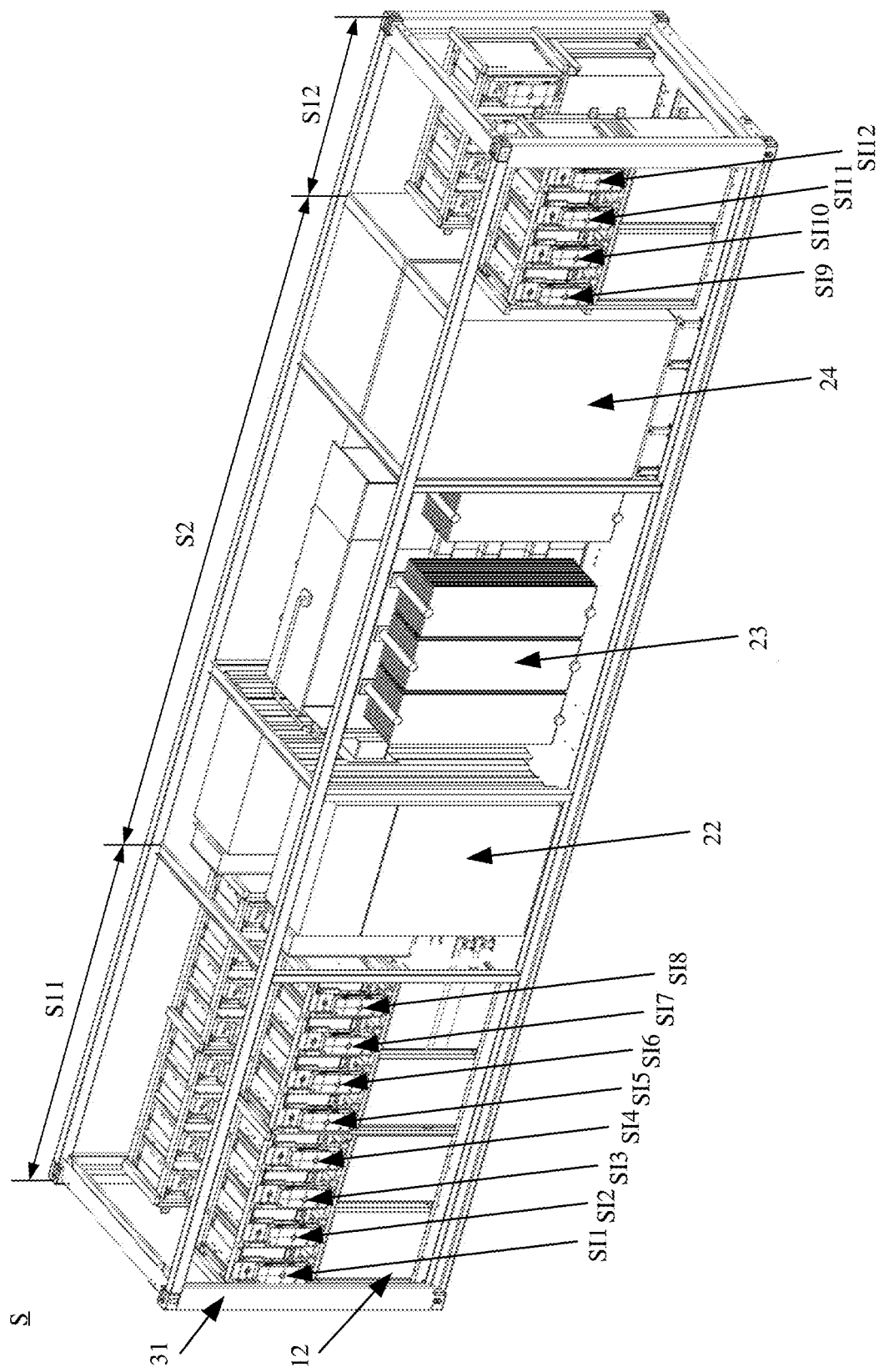
FIG. 6 is a schematic structural diagram of a power generation system S according to an embodiment of this application.

In another possible implementation, as shown in FIG. 6, the power transformation system S may include an integration system (that is, a first integration system S11 and a second integration system S12 in FIG. 6) and the power transformation system S2.

Further, the first integration system S11 may include a plurality of string inverters (that is, the string inverter SI1, the string inverter SI2, the string inverter SI3, the string inverter SI4, the string inverter SI5, and the string inverter SI6, the string inverter SI7, and the string inverter SI8, a total of eight string inverters in FIG. 6) and a plurality of power distribution boxes (it can be learned from FIG. 6 that there are four power distribution boxes 12). The second integration system S12 may include a plurality of string inverters (that is, the string inverter SI9, the string inverter SI10, the string inverter SI11, and the string inverter SI12, a total of four string inverters in FIG. 6) and two power distribution boxes.

Two direct current switches (not shown in FIG. 6) and the two alternating current switches (not shown in FIG. 6) are disposed inside each power distribution box 12. The two direct current switches and two alternating current switches correspond to two string inverters, and are connected to corresponding string inverters.

For example, the direct current switch DC S1, the direct current switch DC S2, the alternating current switch AC S11, and the alternating current switch AC S12 are disposed in the power distribution box 12 on the leftmost side of the first integration system S11 in FIG. 6.

The direct current switch DC S1 and the alternating current switch AC S11 correspond to the string inverter SI1, and the direct current switch DC S2, and the alternating current switch AC S12 correspond to the string inverter SI2. In addition, the direct current switch DC S1 is connected to the direct current side of the string inverter SI, and the alternating current switch AC S11 is connected to the alternating current side of the string inverter SI1. The direct current switch DC S2 is connected to the direct current side of the string inverter SI2, and the alternating current switch AC S12 is connected to the alternating current side of the string inverter SI2.

Optionally, the 12 string inverters may be disposed in a drawer manner or in another installation manner. This is not limited in this embodiment of this application.

In an example, an alternating current switch disposed inside the power distribution box 12 may be an alternating current circuit breaker or an alternating current fuse, and a direct current switch disposed inside the power distribution box 12 may be a direct current circuit breaker or a direct current fuse. Certainly, the alternating current switch and the direct current switch may alternatively be another device configured to isolate and protect the string inverter. This is not limited in this embodiment of this application.

In another example, a surge protection device SPD may be further disposed inside the power distribution box 12. The surge protection device SPD may be configured to prevent the string inverter from being damaged by a surge overvoltage, and may be a lightning arrester (a surge arrester or a surge protector), or another device configured to protect the string inverter. This is not limited in this embodiment of this application.

In still another example, a heat exchanger module (HEM) may be further disposed inside the power distribution box 12. The heat exchanger module HEM may be configured to dissipate heat for the power distribution box 12.

Still refer to FIG. 6. The power transformation system S2 may include the first power distribution cabinet 22 (that is, the first isolation module SM1 in FIG. 4), the transformer 23 (that is, the transformer T in FIG. 4), and the second power distribution cabinet 24 (that is, the second isolation module SM2 in FIG. 4).

Because a voltage value (for example, 380 V) of an alternating current obtained by converting, through the string inverter, a direct current output by the photovoltaic module means is usually lower than that (for example, 10 kV) of the power grid, the first power distribution cabinet 22 may be referred to as a low-voltage cabinet, and the second power distribution cabinet 24 may be referred to as a medium-voltage cabinet. After the first power distribution cabinet 22 transmits an alternating current output by the string inverter (that is, the alternating current output by the integration system S1) to the transformer 23, the transformer 23 needs to boost the alternating current transmitted by the first power distribution cabinet 22, and transmit the boosted alternating current to the power grid by using the second power distribution cabinet 24, so that a plurality of high-power photovoltaic module means may be connected to the power grid.

It can be understood that two alternating current main switches (that is, the alternating current main switch AC S21 and the alternating current main switch AC S22 in FIG. 4) may be disposed inside the first power distribution cabinet 22. Certainly, in addition to the two alternating current main switches, the first power distribution cabinet 22 may further include a power distribution switch, a temperature and humidity controller, a measurement and control apparatus, and the like.

It may also be understood that, because the first power distribution cabinet 22 is disposed between all the string inverters and the transformer 23 in the integration system S1, the first power distribution cabinet 22 (that is, the alternating current main switch AC S21 and the alternating current main switch AC S22) may be configured to isolate all the string inverters from the transformer 23, to protect all the string inverters and the transformer 23.

For example, when the transformer 23 is faulty, the first power distribution cabinet 22 (that is, the alternating current main switch AC S21 and the alternating current main switch AC S22 in the first power distribution cabinet 22) may be configured to prevent a fault from being escalated to the string inverter in the integration system S1, and avoid damage to the string inverter. Certainly, if the string inverter is faulty, the first power distribution cabinet 22 (that is, the alternating current main switch AC S21 and the alternating current main switch AC S22) may also be configured to prevent the fault from being escalated to the transformer 23, and avoid damage to the transformer 23.

It may be further understood that the second power distribution cabinet 24 is disposed between the transformer 23 and the power grid. Therefore, the second power distribution cabinet 24 may be configured to isolate the power grid from the transformer 23, to protect the transformer 23 and the power grid.

For example, when the transformer 23 is faulty, the second power distribution cabinet 24 may be configured to prevent the fault from being escalated to the power grid, and avoid damage to another device in the power grid. Certainly, if the another device in the power grid is faulty, the second power distribution cabinet 24 may also configured to prevent the fault from being escalated to the transformer 23, and avoid the damage to the transformer 23.

In an example, the 12 string inverters (that is, the string inverter SI1 to the string inverter S112), six power distribution boxes 12, a first power distribution cabinet 22, the transformer 23, and the second power distribution cabinet 24 in FIG. 6 may be disposed in a third integration framework 31. In this way, the third integration framework 31 may be installed in a third cabinet (for example, 40 inches).

It can be learned that, a difference between FIG. 5 is that the power generation system S shown in FIG. 6 may be configured to fasten an integration system (including eight string inverters and four power distribution boxes in the first integration system S11, as well as four string inverters and two power distribution cabinets in the second integration system S12) and the power transformation system S2 (including the first power distribution cabinet 22, the transformer 23, and the second power distribution cabinet 24) to a same integration framework (that is, the third integration framework 31), and dispose the third integration framework 31 in a cabinet (that is, the third cabinet) as a whole.

Optionally, the third cabinet may be a container, or may be a skid. Certainly, the third cabinet may alternatively be in another form. This is not limited in this embodiment of this application.

For example, the third bonding conductor BC31 in FIG. 4 may be referred to as the soft connection busbar P. Therefore, the soft connection terminal of the soft connection busbar P is connected to the soft connection terminal of the second bonding conductor BC21 (not shown in FIG. 6) in the first integration system S11 and the second integration system 512, and the hard bonding terminal of the soft connection busbar P is connected to the alternating current main switch AC S21 in the first power distribution cabinet 22.

Similar to the soft connection busbar P, the third bonding conductor BC32 in FIG. 4 may be referred to as the soft connection busbar Q. Therefore, the soft connection terminal of the soft connection busbar Q is connected to the soft connection terminal of the second bonding conductor BC22 (not shown in FIG. 6) in the first integration system S11 and the second integration system S12, and a hard bonding terminal of the soft connection busbar Q is connected to the alternating current main switch DC S22 in the first power distribution cabinet 22.

It may be understood that because the power generation system S may be disposed in the cabinet C as a whole, the power generation system S shown in FIG. 6 may protect the soft connection busbar P and the soft connection busbar Q (waterproof, dust-proof, corrosion-proof, and the like) by using the third cabinet.

It should be noted that, considering that mass of the transformer 23 in the integration system S2 has a high, the integration system is divided into two parts: the first integration system S11 and the second integration system S12, so that the power generation system S is more stable.

Optionally, the power generation system S shown in FIG. 6 may integrate a plurality of collection modules. The collection module may include a temperature sensor, a voltage sensor, and a current sensor. The temperature sensor may be configured to collect temperatures of the primary-side winding and the secondary-side winding in the transformer 23, and an oil temperature of the transformer 23. The voltage sensor may be configured to collect a voltage of the string inverter, and the current sensor may be configured to collect a current of the string inverter.

Therefore, a communication unit between the integration system S1 and the power transformation system S2 may be implemented based on the temperature of the primary-side winding, the temperature of the secondary-side winding, the oil temperature of the transformer 23, the voltage of the string inverter, and the current of the string inverter that are collected by the plurality of collection modules.

In conclusion, according to the power generation system provided in this embodiment of this application, the photovoltaic system including the plurality of photovoltaic module means can be connected to the power grid by using only a direct current cable between the photovoltaic module means and the integration system and the alternating current cable between the power transformation system and the power grid. This avoids complex cabling and layout of the direct current cable and the alternating current cable, facilitates the maintenance of the power generation system, and connects the large-power wind power system to the power grid.

In embodiments provided in this application, it should be understood that the disclosed system may be implemented in other manners. For example, the described apparatus embodiment is merely an example. For example, the unit or module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising an integration system and a power transformation system, and wherein:
   the integration system comprises a direct current input terminal and a first alternating current output terminal, and the power transformation system comprises an alternating current input terminal and a second alternating current output terminal;
   the direct current input terminal is connected to a plurality of direct current power supplies, the first alternating current output terminal is connected to the alternating current input terminal, and the second alternating current output terminal is connected to a power grid;
   the integration system comprises a plurality of inverters and a plurality of first switches, and the plurality of inverters are connected in series to the plurality of first switches in a one-to-one correspondence;
   an input terminal of each inverter of the plurality of inverters is connected to a corresponding direct current power supply in the plurality of direct current power supplies, and an output terminal of each inverter is connected to a first terminal of a corresponding first switch;
   each inverter is configured to convert a direct current from the corresponding direct current power supply into an alternating current, and to output the alternating current to the corresponding first switch;
   the plurality of first switches are configured to combine alternating currents from corresponding inverters, output a combined alternating current to the power transformation system, and isolate the plurality of inverters from the power transformation system;
   the power transformation system is configured to adjust a voltage value of the combined alternating current and output the voltage value to the power grid; and
   each first switch of the plurality of first switches, is configured to: when an inverter connected to the respective first switch is faulty or the system is faulty, turn off based on a first control instruction.

2. The system according to claim 1, wherein the integration system further comprises a plurality of second switches, and the plurality of second switches are connected in series to the plurality of inverters in a one-to-one correspondence;
   one terminal of each second switch of the plurality of second switches is connected to a corresponding direct current power supply, and the other terminal of each second switch is connected to the input terminal of a corresponding inverter; and
   each second switch is configured to isolate the corresponding direct current power supply from the corresponding inverter.

3. The system according to claim 2, wherein each second switch is further configured to:
   when the corresponding direct current power supply connected to the respective second switch is faulty or the corresponding inverter connected to the respective second switch is faulty, turn off based on a second control instruction.

4. The system according to claim 2, wherein each second switch is connected to the corresponding direct current power supply using a first bonding conductor.

5. The system according to claim 4, wherein each first bonding conductor comprises a direct current cable.

6. The system according to claim 4, wherein the integration system further comprises a plurality of surge protection devices; and
   each surge protection device of the plurality of surge protection devices is connected to a corresponding first bonding conductor.

7. The system according to claim 6, wherein each surge protection device is a lightning arrester or a surge protector.

8. The system according to claim 2, wherein each second switch is a direct current switch.

9. The system according to claim 8, wherein each direct current switch is a direct current circuit breaker or a direct current fuse.

10. The system according to claim 1, wherein the power transformation system further comprises a first isolation module, a transformer, and a second isolation module;
    an input terminal of the first isolation module is connected to a second terminal of each first switch, an output terminal of the first isolation module is connected to an input terminal of the transformer, an output terminal of the transformer is connected to an input terminal of the second isolation module, and an output terminal of the second isolation module is connected to the power grid;
    the first isolation module is configured to transmit an alternating current transmitted by each first switch to the transformer, and isolate the integration system from the transformer;
    the transformer is configured to adjust an alternating current output from the first isolation module, and output an adjusted alternating current to the second isolation module; and
    the second isolation module is configured to transmit the adjusted alternating current to the power grid, and isolate the transformer from the power grid.

11. The system according to claim 10, wherein the transformer is a pillow transformer or a corrugated transformer.

12. The system according to claim 1, wherein the integration system further comprises a second bonding conductor;

second terminal(s) of one or more first switches are connected to the second bonding conductor; and the second bonding conductor is configured to combine alternating current(s) from the one or more first switches.

13. The system according to claim 12, wherein the alternating current input terminal of the power transformation system is connected to the second bonding conductor through a third bonding conductor.

14. The system according to claim 13, wherein the third bonding conductor is a soft connection busbar.

15. The system according to claim 1, wherein each inverter is a string inverter.

16. The system of claim 1, wherein each first switch is an alternating current switch.

17. The system according to claim 16, wherein each alternating current switch is an alternating current circuit breaker or an alternating current fuse.

18. The system according to claim 1, wherein each direct current power supply comprises a photovoltaic module means;

each photovoltaic module means comprises a plurality of photovoltaic modules and a combiner box;

an output terminal of each photovoltaic module of the plurality of photovoltaic modules of each photovoltaic module means is connected to an input terminal of the corresponding combiner box, and an output terminal of each combiner box is connected to the input terminal of a corresponding inverter; and each combiner box is configured to combine direct currents generated by the corresponding plurality of photovoltaic modules, and output a combined direct current to the corresponding inverter.

19. The system according to claim 1, wherein each direct current power supply comprises an energy storage battery.

* * * * *